(12) United States Patent
Wakayama et al.

(10) Patent No.: US 8,478,943 B2
(45) Date of Patent: Jul. 2, 2013

(54) CONTENT CACHING DEVICE, CONTENT CACHING METHOD, AND COMPUTER READABLE MEDIUM

(75) Inventors: Shirou Wakayama, Tokyo (JP); Satoshi Ozaki, Tokyo (JP); Naoki Esaka, Tokyo (JP); Kensaku Fujimoto, Tokyo (JP); Kenji Odaka, Tokyo (JP); Yosuke Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 153 days.

(21) Appl. No.: 13/207,292

(22) Filed: Aug. 10, 2011

(65) Prior Publication Data
US 2012/0166732 A1 Jun. 28, 2012

(30) Foreign Application Priority Data
Dec. 28, 2010 (JP) ................................ 2010-293854

(51) Int. Cl.
*G06F 12/00* (2006.01)
*G06F 13/00* (2006.01)
*G06F 13/28* (2006.01)
*G06F 9/44* (2006.01)

(52) U.S. Cl.
USPC ............................ 711/133; 717/106; 717/107

(58) Field of Classification Search
USPC ......................................................... 711/133
See application file for complete search history.

(56) References Cited

U.S. PATENT DOCUMENTS
2003/0120678 A1* 6/2003 Hill et al. ...................... 707/102
2010/0198945 A1* 8/2010 Odaka et al. .................. 709/219

FOREIGN PATENT DOCUMENTS
JP 2001-159998 6/2001
JP 2004-166189 6/2004
JP 2010-176489 8/2010

* cited by examiner

*Primary Examiner* — Arpan P. Savla
*Assistant Examiner* — Craig Goldschmidt
(74) *Attorney, Agent, or Firm* — Knobbe, Martens, Olson & Bear LLP

(57) ABSTRACT

A first acquisition unit acquires each of the resources defined by the scenario, from locations depending on identifiers of the resources. A judging unit judge, when a resource having same identifier and structure as the resource acquired is existent in the cache storage, erases the resource, the identifier thereof, and the receipt time information from the cache storage, and when not existent, stores the acquired resource in association with the identifier thereof and the receipt time information of the bookmark instruction, in the cache storage. A second acquisition, when the identifiers of the resources specified by a first scenario are existent in the cache storage, acquires the resources from the cache storage according to the receipt time information corresponding to the first scenario and identifiers of the resources, and when not existent, acquires the resources from a location depending on the identifiers.

18 Claims, 7 Drawing Sheets

EXAMPLE OF DATA IN BM HISTORY STORAGE

CREATE TABLE bm_history_table(
user_id      UNSIGNED INT,  # IDENTIFIER OF USER GIVING RESERVE INSTRUCTION
scenario_id  VARCHAR,       # SCENARIO IDENTIFIER (URI)
bm_time      DATETIME,      # DATA AND TIME WHEN BM RESERVE INSTRUCTION IS RECEIVED
bm_play_count UNSIGNED INT  # REPRODUCTION FREQUENCY
);

| user_id | scenario_id | bm_time | bm_play_count |
|---|---|---|---|
| 123 | http://example.ip/scenario/1 | 2009-01-12 12:22:30 | 3 |
| 123 | http://example.ip/scenario/2 | 2009-01-14 13:34:43 | 2 |
| 432 | http://example.com/scenario/44 | 2009-03-22 10:42:31 | 20 |

FIG. 6

EXAMPLE OF DATA IN CACHE STORAGE

```
CREATE TABLE cache_table(
  content_uri  VARCHAR,    # Web RESOURCE IDENTIFIER
  bm_time      DATETIME,   # DATA AND TIME WHEN BM RESERVE INSTRUCTION IS RECEIVED
  hash         CHAR(265),  # HASH VALUE OF Web RESOURCE DATA
  data         BLOB#       Web RESOURCE DATA
);
```

| content_uri | bm_time | hash | data |
|---|---|---|---|
| http://example.jp/sha.jpg | 2009-01-12 12:22:30 | FC27E52B 45F14AC1... | binary |
| http://example.jp/get.json?q=tea | 2009-01-14 13:34:43 | 907DE065 F3E31DBE... | binary |
| http://example.jp/hayabusa.mp4 | 2009-03-22 10:42:31 | 226945D6 78FDA90C... | binary |

FIG. 7

CONTENT CACHING DEVICE, CONTENT CACHING METHOD, AND COMPUTER READABLE MEDIUM

CROSS REFERENCE TO RELATED APPLICATIONS

This application is based upon and claims the benefit of priority from the prior Japanese Patent Application No. 2010-293854, filed on Dec. 28, 2010, the entire contents of which are incorporated herein by reference.

FIELD

The embodiment of the present invention relates to a content caching device, a content caching method, and a computer readable medium.

BACKGROUND

There is known a content synthesizer which synthesizes content by combination of a plurality of information items (Web resources) on the Internet in order to let a user view the synthesized content as a program. This is based on the assumption that the original content elements such as image, text, sound, moving image, etc. on the Internet are synthesized, based on a design, by a terminal of the user. Here, this design is called a scenario.

There is a case where the user newly views the content which was previously viewed by the terminal. When the user wants to view the program which was previously viewed by the terminal of the user once again, the information must be reserved somewhere. Generally, the following three locations can be used to reserve the information.

(1) a terminal of the user
(2) another terminal of the user
(3) a server

As for (1), a mobile terminal is regarded as a terminal of the user. In this case, the terminal is supposed to have a small capacity for reserving information, and thus it is unlikely that the terminal of the user is used to reserve the information.

As for (2), television or home server in the home, private server of the user on the network, etc. are regarded as another terminal of the user. However, it is hard to consider that every user has these devices.

As for (3), when a server providing services reserves the information, the server is required to provide the same service to many users. Therefore, the amount of information stored by each user is accumulated, and thus a large amount of information must be reserved. In a conventional technique suggested to solve this problem, the same data is shared among different users. However, in this technique, at least one information item must be reserved in the home or a shared server near the user.

BRIEF DESCRIPTION OF THE DRAWINGS

FIG. 6 shows a data example of the BM history reserved in a BM history storage.

FIG. 7 shows an example of the data reserved in a cache storage.

DETAILED DESCRIPTION

Figure 1:
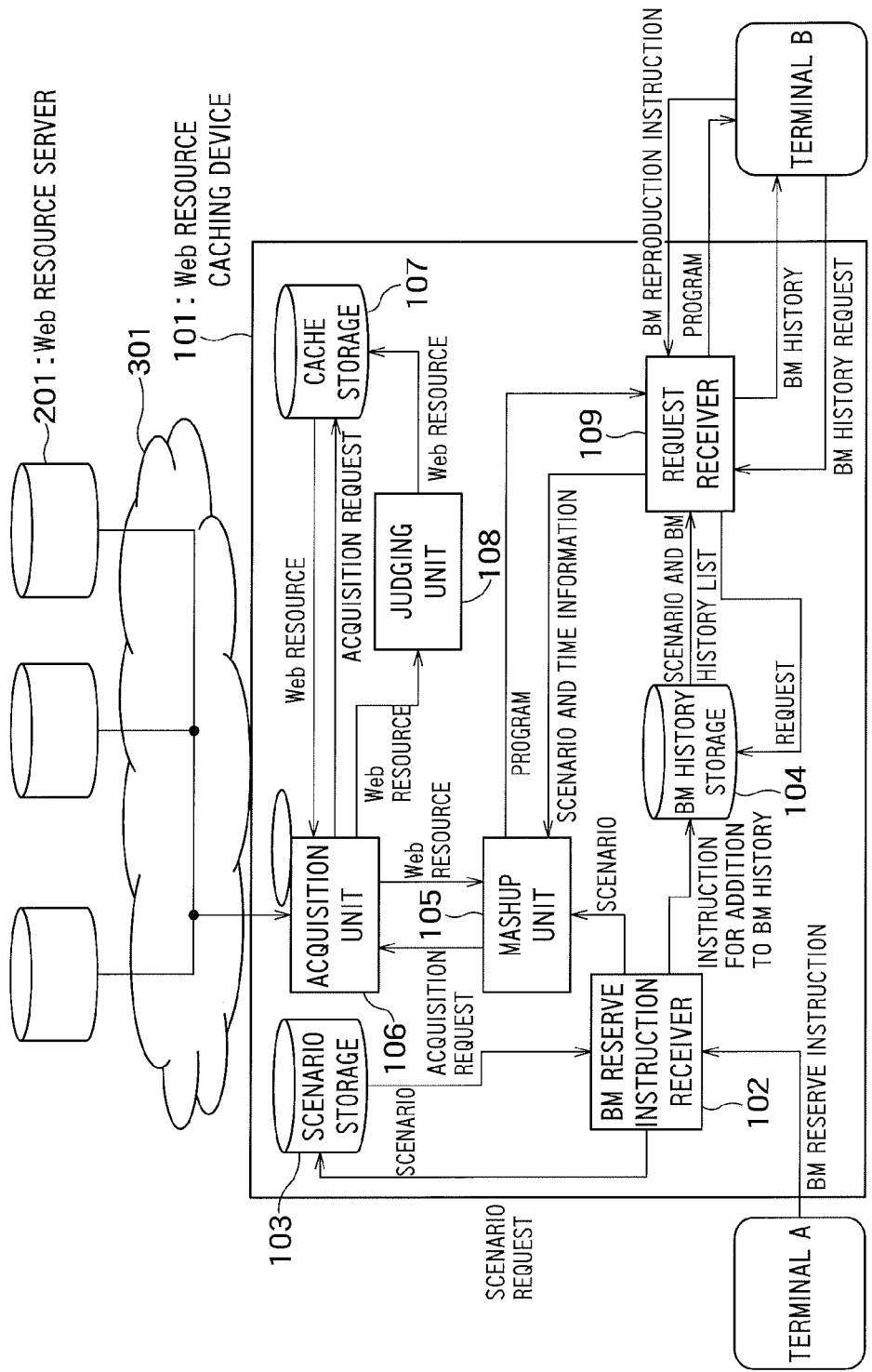
FIG. 1 shows the structure of a Web resource caching device as a content caching device according to the present embodiment.

According to an aspect of embodiments, there is provided a content caching device including: a reserve instruction receiver, a bookmark history storage, a first acquisition unit, a cache storage, a judging unit, a reproduction instruction receiver, a second acquisition unit, a mashup unit and an output unit.

The reserve instruction receiver receives a bookmark instruction for a scenario, the scenario defining a method for synthesizing a plurality of resources each having its identifier.

The bookmark history storage stores the scenario in association with receipt time information of the bookmark instruction received at the reserve instruction receiver.

The first acquisition unit acquires each of the resources defined by the scenario, from locations depending on identifiers of the resources.

The cache storage stores a plurality of resources, identifiers thereof and receipt time information.

The judging unit judges whether a resource having same identifier and structure as the resource acquired by the first acquisition unit is existent in the cache storage, erases, if existent, the resource, the identifier thereof, and the receipt time information from the cache storage, and stores, if not existent, the acquired resource in association with the identifier thereof and the receipt time information of the bookmark instruction, in the cache storage.

The reproduction instruction receiver receives a reproduction instruction for a first scenario, which is one of the scenario in the bookmark history storage.

The second acquisition unit judges whether the identifiers of the resources specified by the first scenario are existent in the cache storage, acquires, if existent, the resources from the cache storage according to the receipt time information corresponding to the first scenario and identifiers of the resources, and acquires, if not existent, the resources from a location depending on the identifiers.

The mashup unit synthesizes the resources acquired by the second acquisition unit based on a reproduction instruction for the first scenario to generate a program.

The output unit outputs the program.

Below, the summary of the present embodiment will be explained. The present embodiment is based on the assumption that a plurality of Web resources such as image, text, sound, moving image, etc. on the Web are acquired and processed by a terminal of a user based on a specific design so that the Web resources are presented to the user as integrated content. In this case, the operation of acquiring and processing the Web resources is called "mashup," and a design for instructing the mashup is called "scenario." Further, the content created by the mashup is called "program." Similarly to the programs broadcasted through TV, various content can be assumed: to continuously reproduce text, image, sound, image, etc.; to reproduce only text, image, or sound; to read text; and to wait an input by the user while automatically changing images, for example.

When using such a terminal, the user sometimes wants to view a previously viewed program once again. Here, a set including a scenario and Web resources to be stored for another view is defined as a bookmark (BM). The BM is formed by combining a scenario and a series of Web resources such as image, text, sound, moving image, etc. to be used in the program or to be required in the mashup process. The Web resource is a single information item identified by URI, and the BM is a combination of a scenario required to reproduce the program and a single or a plurality of Web resource(s).

The present embodiment is based on the premise that Web resources on the Internet are synthesized and presented by a terminal of the user. In such a structure, the original Web content is provided on the Internet. Therefore, when the user wants to view a program again, the original Web resources may be still provided on the Internet, or may not be provided any more (disappeared or changed).

In the present embodiment, the information judged to have strong possibility of disappearing from the Internet or being changed is cached in a content caching device (Web resource caching device), and the cached information is used for another view.

On the other hand, the information of Web resources judged to have strong possibility of being continuously provided on the Internet is not reserved in the content caching device and is acquired from the Internet again at the time of another view. In other words, the original Web resources are not required to be reserved by the user, and should be acquired from the Internet again when the user wants to view the program again.

As stated above, the amount of information to be reserved in a terminal of the user or a server can be reduced, while reducing the possibility that the BM cannot be reproduced due to the nonexistence of required Web resources.

Hereinafter, the present embodiment will be explained in detail.

FIG. 1 shows the structure of a Web resource caching device 101 as a content caching device according to the present embodiment.

The content caching device of FIG. 1 includes: a BM reserve instruction receiver 102; a scenario storage 103; a BM history storage 104; a mashup unit 105; an acquisition unit (first acquisition unit, second acquisition unit) 106; a cache storage 107; a judging unit 108; and a request receiver (reproduction instruction receiver, output unit) 109. Note that the first acquisition unit acquires Web resources when instructed to store a BM (explained later), and the second acquisition unit acquires Web resources when reproducing a scenario. The first acquisition unit and the second acquisition unit may be physically the same device or separate devices.

The BM reserve instruction receiver 102 can establish wireless or wired communication with a terminal A. The request receiver 109 can establish wireless or wired communication with a terminal B. The acquisition unit 106 can establish communication with a plurality of servers 201 through a network 301 such as the Internet. The terminal A is operated by a user to give an instruction to bookmark a scenario. The terminal B is operated by the user to give an instruction to reproduce a scenario. The terminal B may be the same as or different from the terminal A. This content caching device may be arranged as a server in the home of the user, or may be arranged on the Internet.

Hereinafter, the function of each block included in this device and the entire operation will be explained using the flow charts of FIG. 2 to FIG. 5.

Figure 2:
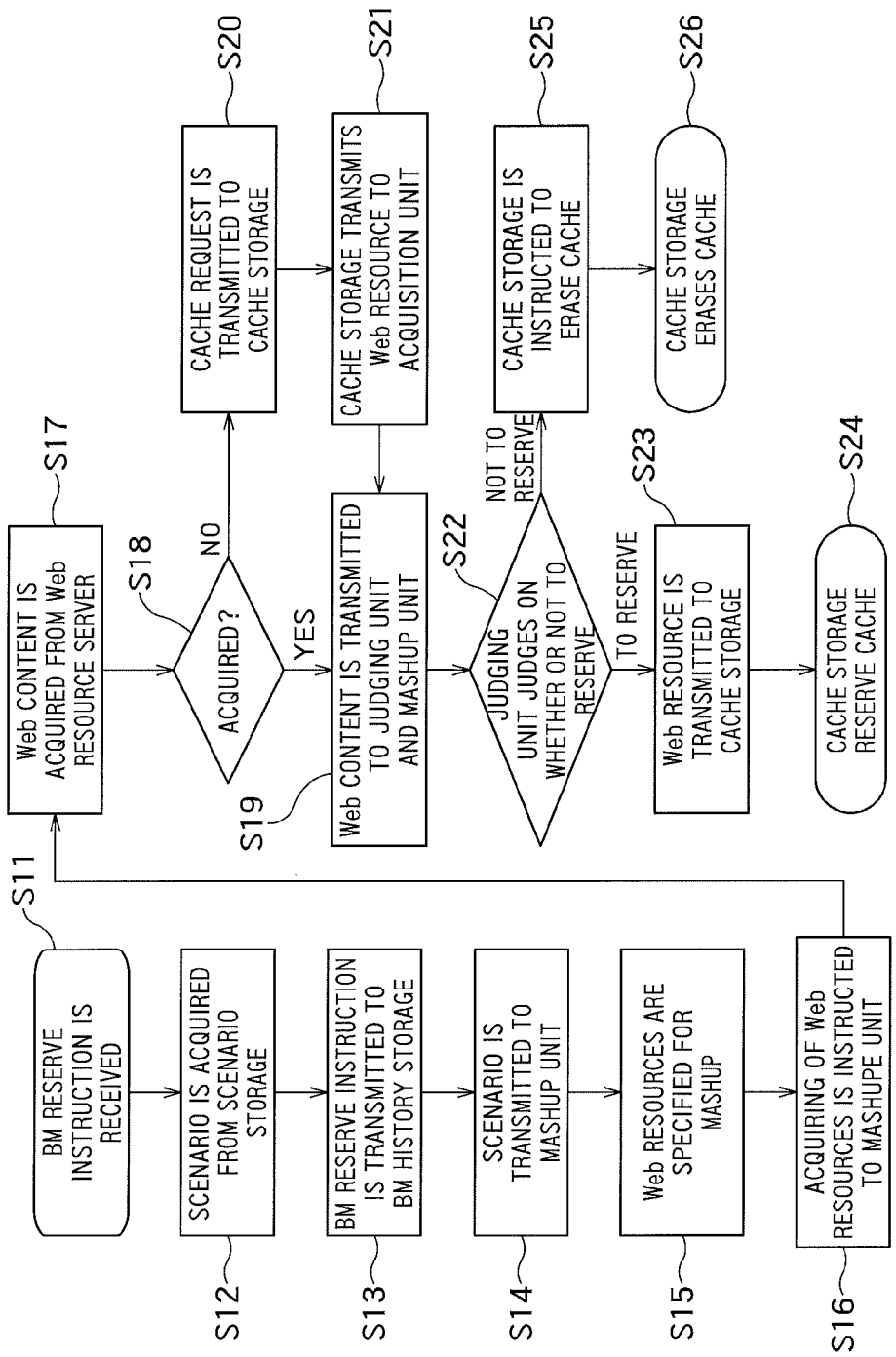
FIG. 2 shows the operation performed by the device of FIG. 1 when instructed to store a bookmark by a terminal.

FIG. 2 shows the operation performed by this device when instructed to store a bookmark by the terminal A.

The BM reserve instruction receiver 102 receives an instruction to store a BM, transmitted from the terminal A of the user (Step S11). This BM reserve instruction includes an identifier (scenario identifier) for identifying a scenario.

The identifier is formed of character strings and values to function as URI, for example. The scenario determines a method for synthesizing a plurality of Web resources (reproduction method) by specifying the identifier (URI etc.) of each Web resource.

The terminal A may give the BM reserve instruction for a scenario which is being reproduced, or for a scenario which is selected from a list of previously reproduced scenarios. Further, the terminal A may give the BM reserve instruction for a scenario which is specified by another method.

The BM reserve instruction receiver 102 requests the scenario from the scenario storage 103 based on the scenario identifier stored in the BM reserve instruction, and acquires the scenario from the scenario storage 103 (Step S12).

In the present embodiment, the scenario storage 103 is arranged in this device, but it may be arranged in a location connected to this device through wired or wireless communication, or may be on the Internet 301. Further, the BM reserve instruction receiver 102 may previously reserve a fixed number of scenarios to reduce the time required to acquire scenarios.

The BM reserve instruction receiver 102 transmits, to the BM history storage 104, a BM reserve instruction including the identifier (user identifier) of the user giving the BM reserve instruction, the scenario identifier, and the receipt time information of the BM reserve instruction (Step S13). The receipt time information represents the time when the BM reserve instruction is given (BM reserve instruction time), namely, the time when the BM reserve instruction is received. The user identifier may be simultaneously acquired when the BM reserve instruction is given, or may be separately acquired in an authentication process if user authentication etc. is performed.

The BM history storage 104 receives the BM reserve instruction, and reserves a BM history including a set of the user identifier, the scenario identifier, and the BM reserve instruction time.

FIG. 6 shows a data example of the BM history reserved in the BM history storage 104.

The BM history storage 104 can reserve a fixed amount of BM history. In the example of FIG. 6, the BM history includes reproduction frequency data. The reproduction frequency is the number of times at which the scenario is reproduced depending on the reproduction instruction by the terminal B. The time data shown in FIG. 6 includes year, date, and time (hour, minute, and second), but all of these items should not be necessarily included. For example, the "year" item may be omitted.

When a certain period of time has passed since receiving the BM reserve instruction, the BM history storage 104 may erase the data corresponding to the instruction by the user. Further, when data amount exceeds a reserve capacity (storage capacity), partial data may be erased. The data to be erased may be determined based on the reproduction frequency of each scenario, the ration (e.g., percentage) of the reproduction frequency of each scenario in the scenarios, or the BM reserve instruction time, for example. Alternatively, the data to be erased can be randomly determined. Data instructed by the user to be stored, or data having reproduction frequency equal to or larger than a fixed value may be excluded from erasure targets.

The BM reserve instruction receiver 102 transmits, to the mashup unit 105, the scenario acquired from the scenario storage 103 and the receipt time information (BM reserve instruction time) (Step S14).

Based on the scenario transmitted from the BM reserve instruction receiver 102, the mashup unit 105 specifies the Web resources required for the mashup of the scenario, (Step S15). The mashup unit 105 transmits, to the acquisition unit 106, the Web resources to be required, namely, acquisition instruction information for instructing to acquire the Web resources specified by the scenario (Step S16). The acquisition instruction information includes the identifier (here, URI) of each Web resource instructed to be acquired, the BM reserve instruction time, etc.

The acquisition unit 106 tries to acquire, from the Web resource servers 201 on the Internet 301, the Web resources specified by the mashup unit 105 based on the identifier of each Web resource (Step S17).

With respect to the Web resource which cannot be acquired from the Web resource servers 201, a cache acquisition request is transmitted to the cache storage 107 (Step S20). The cache storage 107 transmits, to the acquisition unit 106, a corresponding cached Web resource (e.g., Web resource having the same identifier, or related to the same or the latest BM reserve instruction time) (Step S21).

With respect to the Web resource which cannot be acquired from the outside and is not cached in the cache storage 107, an acquisition failure notification is transmitted to the mashup unit 105. In this case, the mashup unit 105 may present the user that the Web resource cannot be acquired.

In Steps S20 and S21, when a Web resource cannot be acquired from the Web resource servers 201, the cache thereof is attempted to be acquired from the cache storage 107. However, this process can be omitted since it is not the essential. In this case, an acquisition failure notification should be transmitted to the mashup unit 105.

The acquisition unit 106 transmits, to the judging unit 108, a set including the Web resource acquired from the Web resource server 201 and the acquisition instruction information (BM reserve instruction time, Web resource identifier, etc.) obtained from the mashup unit 105 (Step S19).

At this time, the acquisition unit 106 may calculate a hash value of the acquired Web resource to transmit the hash value to the judging unit 108. By transmitting the hash value of the Web resource, change in the Web resource having the same identifier can be detected at high speed, as will be explained later.

The judging unit 108 determines whether or not to cache the acquired Web resource, based on the data transmitted from the acquisition unit 106 (Step S22).

When the judging unit 108 determines to reserve, the Web resource, its identifier and the BM reserve instruction time are transmitted to the cache storage 107 (Step S23), and the cache storage 107 reserves the transmitted Web resource, Web resource identifier, and BM reserve instruction time (Step S24). At this time, a hash value may be transmitted to the cache storage 107 so that the cache storage 107 reserves the hash value.

FIG. 7 shows an example of the data reserved in the cache storage 107. One line corresponds to one record. In this example, Web resource identifier, BM reserve instruction time, Web resource data (bits), and hash value of the Web resource data are reserved. Resources having the same hash value have the same structure (data). The Web resource reserved in the cache storage 107 is sometimes called simply "cache." Web resources having the same identifier but having different BM reserve instruction time are reserved separately from each other. This makes it possible to obtain a Web resource at a specific time in the past. Note that a scenario ID may be added to the cache storage 107 in order to identify the scenario which uses the Web resource, and to consider the reproduction frequency etc. depending on the scenario.

The cache storage 107 may erase data (record) showing that a certain period of time has passed since reserving it. Further, there is a method to erase cache with a fixed probability. In this case, this probability may dynamically vary depending on settings of the user, content of the program, BM reproduction rate, and BM reproduction frequency. Further, Web resources which do not affect BM reproduction may be preferentially erased. When a scenario is erased by the BM history storage 104, the cache storage 107 may erase resources which are used in the erased scenario and are not used in the other scenarios reserved in the BM history storage 104.

When the judging unit 108 determines not to reserve, the judging unit 108 instructs the cache storage 107 to erase the cache (Step S25), and the cache storage 107 erases the cache together with the Web resource identifier, BM reserve instruction time, hash value, etc. related thereto (Step S26). The instruction to erase the cache may be given when determining not to reserve, or may be given later in order to reduce processing loads.

Hereinafter, the reserve judgment process performed in Step S22 will be explained in further detail.

Figure 3:
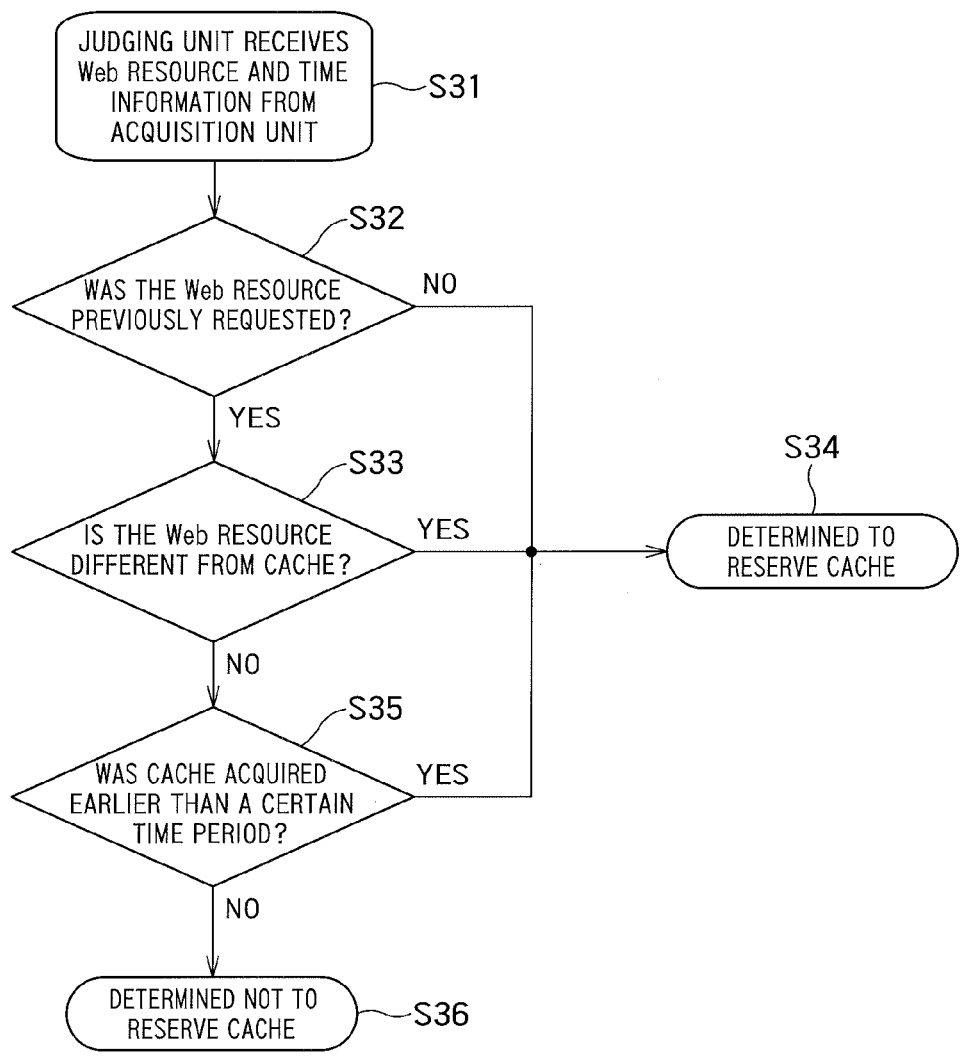
FIG. 3 shows the operation flow of reserve judgment.

FIG. 3 shows the operation flow of reserve judgment.

The judging unit 108 receives, from the acquisition unit 106, a Web resource (or hash value if has been transmitted), the identifier of the Web resource, and the BM reserve instruction time included in the acquisition instruction information (Step S31).

The judging unit 108 judges whether a resource having the same identifier as the Web resource was requested in the past (S32). This is realized by confirming whether the same identifier as the Web resource is reserved in the cache storage.

When judging that the Web resource was not previously requested, the judging unit 108 determines to let the cache storage 107 reserve the Web resource (Step S34). The cache storage 107 reserves the Web resource together with its identifier, BM reserve instruction time, and hash value.

When a resource having the same identifier as the Web resource was requested in the past, the following check is performed.

Judgment is made on whether the structure of the acquired Web resource is different from that of the Web resource (cache) having the same identifier and reserved in the cache storage 107 (Step S33). That is, whether the data (bits) of both Web resources are consistent is judged. When the hash value of the Web resource is transmitted from the acquisition unit 106, the transmitted hash value is compared with the hash value of the cache instead of performing data comparison, which realizes high-speed judgment.

In the judgment in Step S33, when the structure of the acquired Web resource is different from that of the stored Web resource (cache), the acquired Web resource is determined to be reserved in the cache storage 107 (Step S34). The cache storage 107 reserves the Web resource together with its identifier, BM reserve instruction time, and hash value.

When the structure of the acquired Web resource is consistent with that of the stored Web resource (cache), the BM reserve instruction time of the cache is checked (Step S35).

If the time when the cache was stored is later than a time point which is earlier than the target BM reserve instruction time (transmitted from the acquisition unit 106) by a certain period of time, that is, when the time difference between the BM reserve instruction time of the target and the BM reserve instruction time of the cache is smaller than a threshold value, the cache and the data related thereto are erased, and the acquired Web resource is determined not to be reserved (Step S36).

Here, a certain period of time means a relatively long period such as one month. When a Web resource is instructed to be acquired a plurality of times and the Web resource obtained from the Web resource server is not changed during this period, if the interval is short, it can estimate that the interval until the next acquisition instruction becomes short and that the Web resource is not changed (namely the same), which lead to the judgment to erase the cache.

On the other hand, when the BM reserve instruction time of the cache is earlier than the point which is earlier than the target BM reserve instruction time by a certain period of time, that is, when the time difference between the BM reserve instruction time of the target and the BM reserve instruction time of the cache is equal to or larger than the threshold value, it is determined to continuously reserve the cache and not to reserve the acquired Web resource (Step S34). This is called a first method. In this case, as an alternative method, the BM reserve instruction time of the cache may be updated to the BM reserve instruction time of the target (second method). Further, it is also possible to store only the BM reserve instruction time of the target and the identifier of the Web resource in the cache storage 107 in order to obtain the main body of the Web resource data (bits) by referring to the cache (third method). In the third method, a field for the ID of the record to be referred to should be added in the table of the cache storage.

The first method and the second method are effective to reduce the capacity of the cache storage as much as possible. Under the premise that once the content (structure) of a certain resource on the Internet is changed, the resource does not have the original content again (or with extremely low possibility), when reproducing a scenario related to the cached BM reserve instruction time or the target BM reserve instruction time, it becomes extremely likely that the content at the time of the given instruction can be identically reproduced. The third method slightly increases the capacity of the cache storage 107 compared to the first and second methods, but this is a technique realizing a more reliable reproduction.

The above explanation made using FIG. 2 concerns the operation when a BM reserve instruction is made. Hereinafter, the operation when reproducing a BM will be explained. When reproducing a BM, the terminal (hereinafter, the terminal B) required to reproduce the BM acquires a BM history (BM list) from this device and specifies the BM to be reproduced in the BM list.

Figure 4:
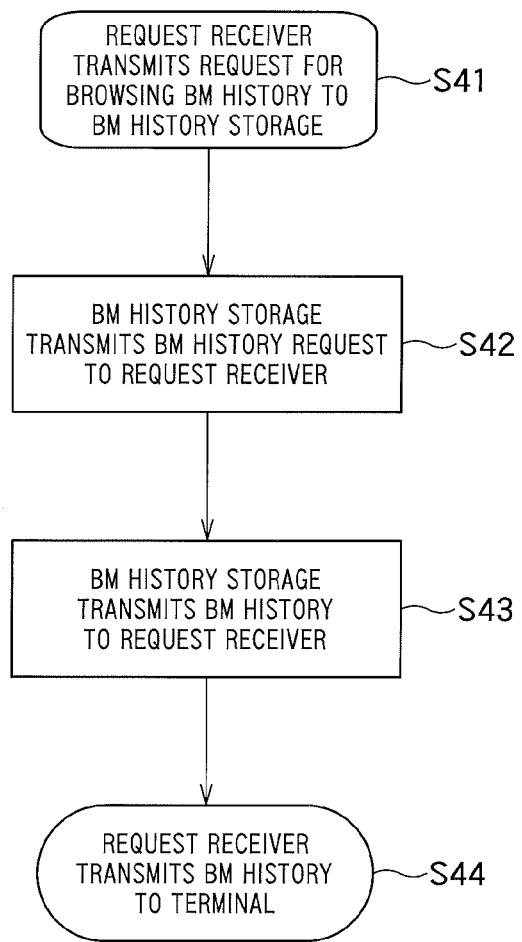
FIG. 4 shows the operation performed by this device when a BM history is requested.

FIG. 4 shows the operation performed by this device when a BM history is requested.

Figure 5:
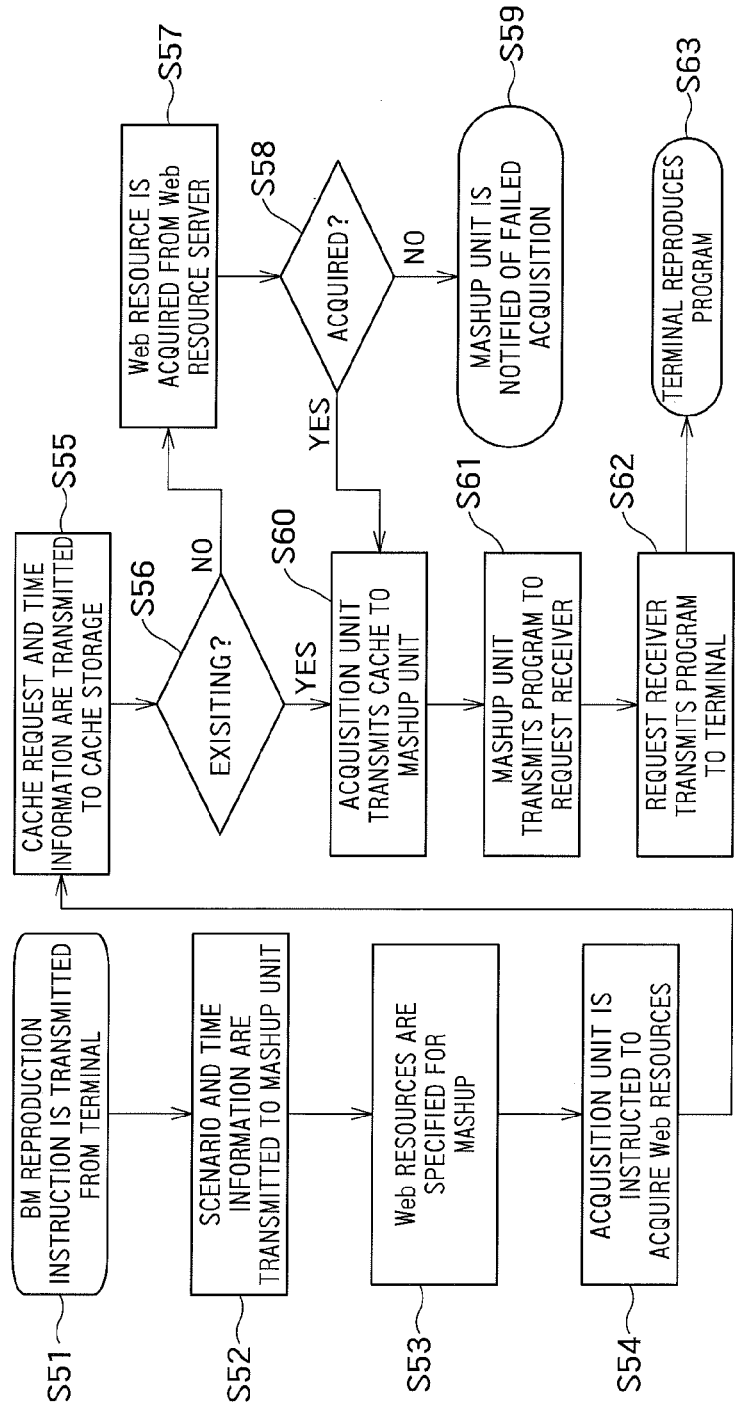
FIG. 5 shows the operation performed by this device when instructed to reproduce a bookmark.

FIG. 5 shows the operation performed by this device when instructed to reproduce a bookmark.

In FIG. 4, first, the terminal required to reproduce a BM (hereinafter, the terminal B) transmits a request for browsing the BM history to the request receiver 109 (Step S41). Note that the reproduction terminal B may be the same as or different from the terminal A giving BM reserve instructions. In this way, when a user bookmarks the content viewed through a mobile terminal out of the house, the user after returning home can successively or newly enjoy the content by a big-screen TV with finer information.

The request receiver 109 transmits a request to acquire the BM history to the BM history storage 104 (Step S42).

The BM history storage 104 transmits the BM history to the request receiver 109 (Step S43). The BM history includes a plurality of BMs.

The request receiver 109 transmits the BM history to the terminal B (Step S44). The terminal B presents this BM history to the user to let the user select a BM to be reproduced, namely, a scenario to be reproduced. The scenario selected to be reproduced corresponds to a first scenario.

In FIG. 5, when the BM to be reproduced is specified by the user, the terminal B transmits a BM reproduction instruction to the request receiver 109 (Step S51).

The request receiver 109 receives the reproduction request, and transmits the receipt time information (BM reserve instruction time) and scenario of the specified BM to the mashup unit 105 (Step S52).

The mashup unit 105 performs the mashup of the scenario. First, the mashup unit 105 specifies the Web resource specified by the scenario and required for the mashup (Step S53), and transmits a request for acquiring the specified Web resource to the acquisition unit 106 (Step S54). The acquisition request includes the BM reserve instruction time and the identifier of the Web resource required to be acquired.

Based on the BM reserve instruction time and Web resource identifier, the acquisition unit 106 transmits a request for acquiring the cache to the cache storage 107, (Step S55). This cache acquisition request includes the BM reserve instruction time and the Web resource identifier.

The cache storage 107 inspects whether a cache (Web resource) related to the same identifier as the Web resource identifier and related to the same time as the BM reserve instruction time is existent (Step S56). If existent, the cache is transmitted to the acquisition unit 106, and the acquisition unit 106 further transmits the cache to the mashup unit 105 (Step S57).

At this time, when the first method is used in Step S34 of FIG. 3, if the cache is judged not to be existent in this Step S56, the following process may be performed. That is, whether a cache related to the same identifier as the Web resource identifier is existent is inspected, and if existent, a previous cache related to the time closest to the BM reserve instruction time is transmitted to the acquisition unit 106. This corresponds to the first method, in which when two Web resources are judged to have the same structure in Step S33 of FIG. 3, the original one existent in the cache storage 107 is kept as it is, and the other one (Web resource acquired from Web resource servers 201) is erased. As stated above, this first method is effective in the situation where once the content (structure) of a certain resource on the Internet is changed, the resource hardly have the original content again. Note that even when the original content is restored, no affect is caused in the operation. When the first method is employed on the premise that the original content is hardly restored, if a plurality of Web resources (caches) judged to have the same identifier are existent in the cache storage 107 in Step S33 of FIG. 3, only the Web resource related to the time closest to the target BM reserve instruction time may be selected to judge whether it is the same or not.

When the second method is used in Step S34 of FIG. 3, similar concept can be applied. When no cache is judged to be existent in Step S56, if a cache related to the same identifier as the Web resource identifier is existent, a most recent cache closest to the BM reserve instruction time may be transmitted to the acquisition unit 106.

On the other hand, when no corresponding cache is existent, the cache storage 107 notifies the acquisition unit 106 that effect, and the acquisition unit 106 tries to acquire the Web resource from the Web resource servers 201, based on the identifier of the Web resource (S58). When a BM reserve instruction is given, the Web resource has been acquired at least once (see Step S17 of FIG. 2). Thus, when no available cache is existent, the Web resource is judged by the judging unit 108 that it is not necessary to reserve the cache thereof (see Steps S22 and S25 of FIG. 2).

When the acquisition unit 106 cannot acquire the Web resource, that is, when the Web resource is not existent on the Internet 301, the mashup unit 105 is notified that effect (S58, S59).

When the Web resource can be acquired, the acquisition unit 106 transmits the acquired Web resource to the mashup unit 105 (S58, S60).

The mashup unit 105 completes the mashup of the scenario using the Web resources acquired by the acquisition unit 106, and transmits a program obtained as a result of the mashup to the request receiver 109 (Step S61). When there is a Web resource which cannot be acquired, a suitable resource may be arranged in its portion. The suitable resource may be previously stored in this device, or may be acquired from a server on the network by an arbitrary method. For example, it is possible to search and use similar information, or to use alternative content such as advertisement.

The request receiver 109 transmits the program provided by the mashup unit 105 to the terminal B (Step S62).

The terminal B displays the program received from the request receiver 109 (Step S63). In this way, the scenario when the BM reserve instruction is given can be reproduced by the terminal B.

As stated above, in the present embodiment, in Web resources specified by the scenario instructed to be bookmarked, the Web resources judged to be capable of being acquired from the network at the time of another view in future are not reserved by this device, which makes it possible to further reduce the amount of information to be reserved compared to the conventional case.

In this method, when a Web resource determined not to be reserved by the judging unit 108 disappears from the Internet or changes, the Web resource cannot be acquired and it becomes impossible to synthesize a program same as the scenario for which the BM reserve instruction is given. However, the present embodiment accepts such a risk to some extent to reduce the capacity for reserving cache, and thus makes a great contribution to reduce the reserve capacity of the caching device.

In the present embodiment, Web resources are reserved in the servers on the Internet, but those may be reserved in the same terminal, a home network, or a LAN. Further, the identifier of the Web resource is assumed to be URI, but it may be file pass, IP address, etc.

Note that the Web resource cache device can be realized by using a general computer device as basic hardware, for example. That is, each element included in the Web resource cache device may be realized by letting a computer carry out a software (computer program) describing instructions of each process. In this case, the Web resource cache device can be realized by previously installing the computer program in the computer device or by properly installing, in the computer device, the computer program stored in a non-transitory computer readable medium such as hard disk, memory device, optical disk, etc. or distributed through the network. Further, each storage can be realized by properly using a storage medium such as internal/external memory or hard disk of the above computer device, CD-R, CD-RW, DVD-RAM, DVD-R, etc.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A content caching device comprising:
   a reserve instruction receiver configured to receive a bookmark instruction for a first scenario, wherein the first scenario is associated with a plurality of resources each associated with an identifier;
   a bookmark history storage configured to store one or more scenarios including the first scenario and first receipt time information relating to when the bookmark instruction is received;
   a first acquisition module configured to acquire the resources associated with the first scenario, from locations depending on the identifiers associated with the resources;
   a cache storage configured to store a plurality of resources, associated identifiers, and second receipt time information relating to when the plurality of resources are stored in the cache;
   an evaluator configured to determine, for one or more of the acquired resources, whether a previously stored resource having the same identifier as the acquired resource exists in the cache storage and
      when the previously-stored resource exists, to erase from the cache storage the previously-stored resource, the identifier associated with the previously-stored resource, and the second receipt time information associated with the previously-stored resource, and store in the cache storage the acquired resource and the identifier associated with the acquired resource, along with the first receipt time information associated with the acquired resource from the bookmark history storage as the second receipt time information associated with the acquired resource, and
      when the previously-stored resource does not exist, to store in the cache storage the acquired resource and the identifier associated with the acquired resource, along with the first receipt time information associated with the acquired resource from the bookmark history storage as the second receipt time information associated with the acquired resource;
   a reproduction instruction receiver configured to receive a reproduction instruction for a second scenario, which is one of the scenarios in the bookmark history storage, wherein the second scenario is associated with a plurality of resources each associated with an identifier;
   a second acquisition module configured to determine, for one or more of the identifiers associated with the second scenario, whether the second scenario identifier(s) exist in the cache storage and
      if the second scenario identifier(s) exist in the cache storage, to acquire the resource(s) associated with the second scenario identifier(s) from the cache storage, and
      if the second scenario identifier(s) do not exist in the cache storage, to acquire the resource(s) associated with the second scenario identifiers from a location or locations associated with the second scenario identifier(s);
   a mashup module configured to synthesize the resources acquired by the second acquisition module based on the reproduction instruction for the second scenario and thereby generate a program; and
   an output module configured to output the program.

2. The device of claim 1, wherein the evaluator is further configured to determine whether a time difference between the second receipt time information corresponding to the previously-stored resource determined to exist in the cache storage and the first receipt time information corresponding to the time of receiving the bookmark instruction associated with the previously-stored resource is smaller than, larger than, or equal to a threshold value, and when the time difference is smaller than the threshold value, erase the previously-stored resource from the cache storage and when the time difference is equal to or larger than the threshold value, not erase the previously-stored resource.

3. The device of claim 1, wherein the bookmark history storage is further configured to store reproduction frequency of each scenario for which reproduction instructions have been given, and to erase one or more of the scenarios when a storage capacity of the bookmark history storage reaches a fixed value or when an instruction to erase is received, and wherein the one or more scenarios to be erased have the lowest reproduction frequency.

4. The device of claim 1, wherein the bookmark history storage is further configured to store reproduction frequency of each scenario for which reproduction instructions have been given, and to erase one or more of the scenarios depending on the reproduction frequencies when a storage capacity of the bookmark history storage reaches a fixed value or when an instruction to erase is received.

5. The device of claim 1, wherein the bookmark history storage is further configured to erase a scenario based on when a period of time has passed from the first receipt time information for that scenario.

6. The device of claim 3, wherein the cache storage is further configured to erase a resource that is associated with the erased scenario and that is not associated with another scenario in the bookmark history storage.

7. A content caching method comprising:

receiving a bookmark instruction for a first scenario, wherein the first scenario is associated with a plurality of resources each associated with an identifier;

storing, in a bookmark history storage, one or more scenarios including the first scenario and first receipt time information relating to when the bookmark instruction is received;

acquiring the resources associated with the first scenario, from locations depending on the identifiers of the resources;

for one or more of the acquired resources, determining whether another resource having the same identifier as the acquired resource already exists in a cache storage and when the other resource exists, erasing the other resource, an identifier associated with the other resource, and second receipt time information associated with the other resource relating to when the other resource was stored in the cache, and storing in the cache storage the acquired resource and the identifier associated with the acquired resource, along with the first receipt time information associated with the acquired resource from the bookmark history storage as second receipt time information associated with the acquired resource, and when the other resource does not exist, storing in the cache storage the acquired resource and the identifier associated with the acquired resource, along with the first receipt time information associated with the acquired resource from the bookmark history storage as second receipt time information associated with the acquired resource;

receiving a reproduction instruction for a second scenario, which is one of the scenarios in the bookmark history storage, wherein the second scenario is associated with a plurality of resources each associated with an identifier;

determining, for one or more of the identifiers associated with the second scenario, whether the second scenario identifier(s) exist in the cache storage and if the second scenario identifier(s) exist in the cache storage, acquiring the resource(s) associated with the second scenario identifier(s) from the cache storage, and if the second scenario identifier(s) do not exist in the cache storage, acquiring the resource(s) associated with the second scenario identifiers from a location or locations associated with the second scenario identifiers;

synthesizing the acquired resources based on the reproduction instruction for the second scenario and thereby generating a program; and outputting the program.

8. The method of claim 7, further comprising determining whether a time difference between the second receipt time information corresponding to the other resource determined to exist in the cache storage and the first receipt time information corresponding to the time of receiving the bookmark instruction associated with the other resource is smaller than, larger than, or equal to a threshold value, and when the time difference is smaller than the threshold value, erasing the other resource from the cache storage and when the time difference is equal to or larger than the threshold value, not erasing the other resource.

9. The method of claim 7, further comprising storing reproduction frequency of each scenario for which reproduction instructions have been given, and erasing one or more of the scenarios when a storage capacity of the bookmark history storage reaches a fixed value or when an instruction to erase is received, wherein the one or more scenarios to be erased have the lowest reproduction frequency.

10. The method of claim 7, further comprising storing reproduction frequency of each scenario for which reproduction instructions have been given, and erasing one or more of the scenarios depending on the reproduction frequencies when a storage capacity of the bookmark history storage reaches a fixed value or when an instruction to erase is received.

11. The method of claim 7, further comprising erasing a scenario based on when a period of time has passed from the first receipt time information for that scenario.

12. The method of claim 9, further comprising erasing a resource that is associated with the erased scenario and that is not associated with another scenario in the bookmark history storage.

13. A non-transitory computer readable medium storing a computer program which, when executed by a computer, causes the computer to perform acts comprising:

receiving a bookmark instruction for a first scenario, wherein the first scenario is associated with a plurality of resources each associated with an identifier;

storing, in a bookmark history storage, the first scenario and first receipt time information relating to when the bookmark instruction is received;

acquiring the resources associated with the first scenario, from locations depending on the identifiers of the resources;

for one or more of the acquired resources, determining whether another resource having the same identifier as the acquired resource already exists in a cache storage and when the other resource exists, erasing the other resource, an identifier associated with the other resource, and second receipt time information associated with the other resource relating to when the other resource was stored in the cache, and storing in the cache storage the acquired resource and the identifier associated with the acquired resource, along with the first receipt time information associated with the acquired resource from the bookmark history storage as second receipt time information associated with the acquired resource, and when the other resource does not exist, storing in the cache storage the acquired resource and the identifier associated with the acquired resource, along with the first receipt time information associated with the acquired resource from the bookmark history storage as second receipt time information associated with the acquired resource;

receiving a reproduction instruction for a second scenario, which is one of the scenarios in the bookmark history storage, wherein the second scenario is associated with a plurality of resources each associated with an identifier;

determining, for one or more of the identifiers associated with the second scenario, whether the second scenario identifier(s) exist in the cache storage and if the second scenario identifier(s) exist in the cache storage, acquiring the resource(s) associated with the second scenario identifier(s) from the cache storage, and if the second scenario identifier(s) do not exist in the cache storage, acquiring the resource(s) associated with the second scenario identifiers from a location or locations associated with the second scenario identifiers;

synthesizing the acquired resources based on the reproduction instruction for the second scenario and thereby generating a program; and outputting the program.

14. The medium of claim 13, wherein the computer program, when executed by a computer, further causes the computer to perform acts comprising:

determining whether a time difference between the second receipt time information corresponding to the other resource determined to exist in the cache storage and the first receipt time information corresponding to the time of receiving the bookmark instruction associated with the other resource is smaller than, larger than, or equal to a threshold value, and when the time difference is smaller than the threshold value, erasing the other resource from the cache storage and when the time difference is equal to or larger than the threshold value, not erasing the other resource.

15. The medium of claim 13, wherein the computer program, when executed by a computer, further causes the computer to perform acts comprising:

storing reproduction frequency of each scenario for which reproduction instructions have been given, and erasing one or more of the scenarios when a storage capacity of the bookmark history storage reaches a fixed value or when an instruction to erase is received, wherein the one or more scenarios to be erased have the lowest reproduction frequency.

16. The medium of claim 13, wherein the computer program, when executed by a computer, further causes the computer to perform acts comprising:

storing reproduction frequency of each scenario for which reproduction instructions have been given, and erasing one or more of the scenarios depending on the reproduction frequencies when a storage capacity of the bookmark history storage reaches a fixed value or when an instruction to erase is received.

17. The medium of claim 13, wherein the computer program, when executed by a computer, further causes the computer to perform acts comprising:

erasing a scenario based on when a period of time has passed from the first receipt time information for that scenario.

18. The medium of claim 15, wherein the computer program, when executed by a computer, further causes the computer to perform acts comprising:

erasing a resource that is associated with the erased scenario and that is not associated with another scenario in the bookmark history storage.

* * * * *